March 27, 1934.  D. M. SOLENBERGER  1,952,339
VALVE STEM SEALING DEVICE
Filed Feb. 1, 1932
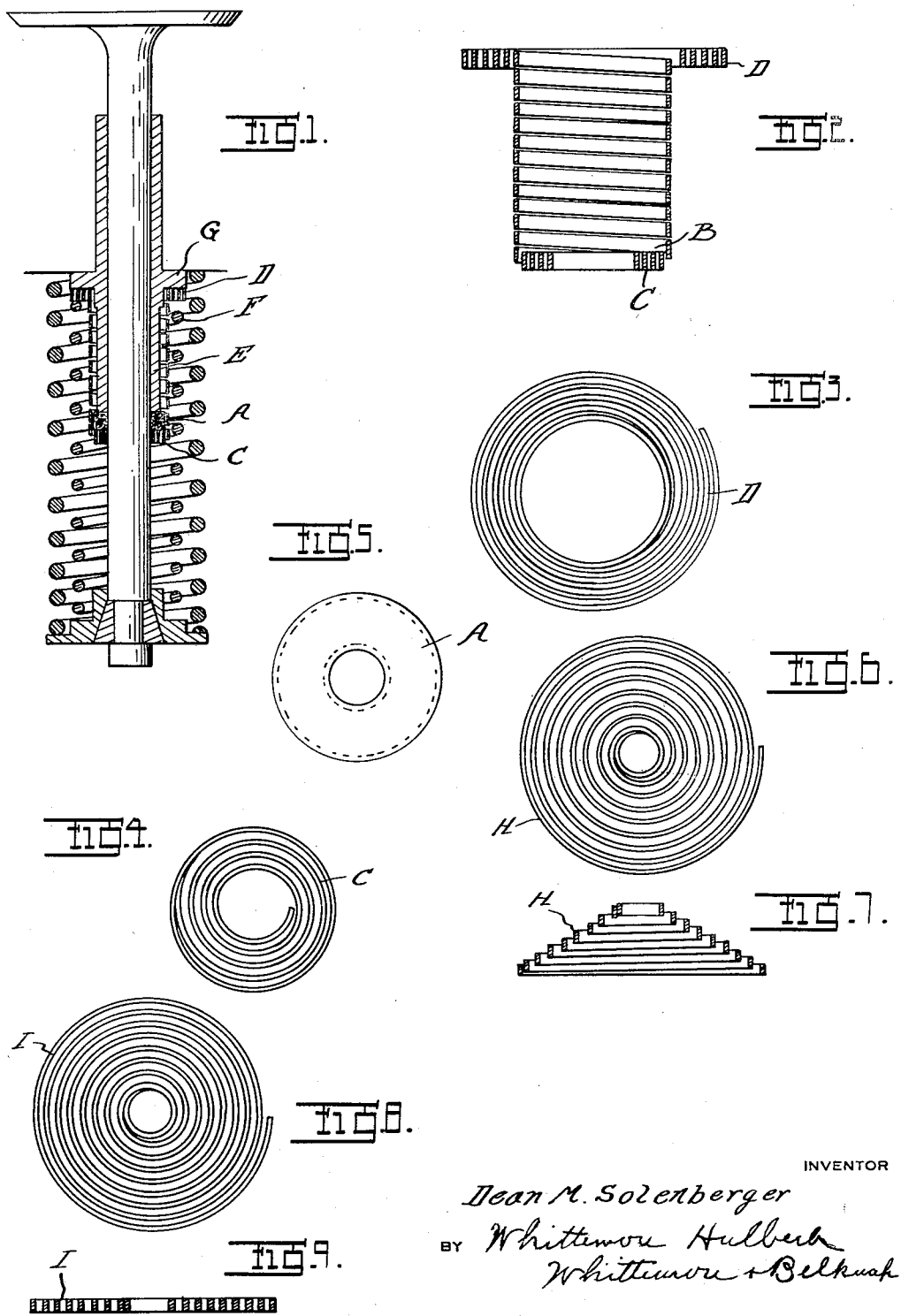
INVENTOR
Dean M. Solenberger
BY Whittemore Hulbert
Whittemore + Belknap
ATTORNEYS Patented Mar. 27, 1934

1,952,339

UNITED STATES PATENT OFFICE 1,952,339

VALVE STEM SEALING DEVICE

Dean M. Solenberger, Cleveland, Ohio

Application February 1, 1932, Serial No. 590,212

5 Claims. (Cl. 286—30)

The invention relates to sealing devices designed for use in preventing leakage between a valve stem and its guide, such for instance as might be used on the stem of an inlet valve for internal combustion engines. It is the object of the invention to obtain a construction which is universally applicable to various specific constructions of valves and associated parts and which will maintain an effective seal under operating conditions. To this end the invention consists in the construction as hereinafter set forth.

In the drawing:

Figure 1 is a sectional elevation of a valve stem and guide showing my improved sealing device applied thereto;

Figure 2 is a similar section through the helical spring cup;

Figure 3 is a plan view thereof;

Figure 4 is a reverse plan view;

Figure 5 is a plan view of the sealing washer indicating in dotted lines the relative size of the valve stem and cup.

Figure 6 is a plan view of a modified construction;

Figure 7 is a central longitudinal section therethrough;

Figure 8 is a plan view of still another modification, and

Figure 9 is a central cross section therethrough.

It is a known fact that a worn valve stem or guide therefor will seriously affect the running of an internal combustion engine, particularly with respect to the inlet valves. Thus on the suction stroke air will be drawn through the clearance between the valve and its stem and by destroying the proper proportion between the air and fuel will affect the running of the engine. Usually the valve is returned to its seat by one or more helical springs surrounding the stem and guide and frequently the proportions are such as to leave but slight clearance between the spring and the guide.

To stop the leakage between the stem and guide I have devised a construction in which a sealing washer is floatingly held upon the stem and resiliently pressed towards the external end of the guide. The construction is also one which may be readily installed even where the clearance between the guide and surrounding valve spring is relatively slight.

In detail, A is a washer of felt or other suitable packing material adapted to be sleeved upon the valve stem and B is a cup in which this washer is placed which is resiliently pressed towards the end of the guide. The cup B is preferably formed of a helical coil of resilient metallic ribbon being of a dimension to fit about the guide and between the same and the valve spring. The end of the cup is formed by a spirally wound inward extension C of the helical coil and at the opposite end is a spirally wound outward extension D of the coil forming an anchorage for the same. As shown in Figure 1, the device is installed by sleeving the cup B about the valve guide E with the anchorage portion D between the end of the valve spring F and its abutment G. The longitudinal dimensions of the cup are such that when the washer A is in contact with the end of the guide, the helical coil will be elongated and placed under tension which will resiliently press the washer against the end of the guide. If, however, the parts are badly worn there may be more or less oscillation of the valve stem within the guide and by reason of the flexibility of the cup the washer A is permitted to float with the stem while still maintaining the seal with the guide.

As indicated in Figure 5, the sealing washer may be originally of a diameter slightly greater than the internal diameter of the cup B, and the aperture through which the stem passes may be originally of smaller diameter than the stem. This will place the material under radial compression when engaged with the cup and the stem, thereby forming a more effective seal.

While I prefer to form the cup B as shown of a ribbon wire, it may be formed of round wire where the clearance between the parts is sufficient to admit such constructions. Also in place of forming a helical coil of uniform diameter throughout its length, a spiral coil H may be substituted as indicated in Figures 6 to 9. In the latter figure, a spiral coil I is shown as normally in a plane but when installed will be drawn out into the form of a tapered helix. In Figure 7 the normal form is that of a tapered helix which will be further elongated when installed in connection with the valve.

The floating support for the sealing washer together with the compression of the material greatly increases the length of life and the effectiveness of the seal. It is obvious that other means might be employed for accomplishing these functions but I believe that the resilient cup is best adapted for the purpose.

What I claim as my invention is:

1. A sealing device for valve stems having a valve stem guide comprising a resilient washer surrounding the stem and means for resiliently pressing said washer against the valve stem guide with a predetermined limited resilient pressure permitting the floating movement of the same with the stem, said means being contractible to compensate for compression of said washer and to maintain the resilient pressure thereon.

2. A sealing device for valve stems having a valve stem guide comprising a resilient washer surrounding the stem and engaging the end of the valve stem guide, and resilient contractible means for placing said washer under axial and radial compression.

3. A sealing device for valve stems having a valve stem guide comprising a resilient washer surrounding the stem and engaging the external end of the valve stem guide, and an axially and radially contractible resilient cup surrounding said guide, anchored at its inner end, and holding said washer in its outer end.

4. A sealing device for valve stems having a valve stem guide comprising a sealing washer for engaging the valve stem and the valve stem guide, a helical resilient coil for surrounding the valve stem guide, the outer end of said coil forming a cup for engaging said washer and the inner end of said coil adapted to be anchored to said guide.

5. A sealing device for valve stems having a valve stem guide comprising a sealing washer adapted to engage the stem, a cup formed of a helical coil of wire surrounding the valve stem guide and having a radially inward spiral extension at its outer end for engaging said washer and a spiral outward extension at its opposite end adapted to engage between the valve stem and its anchorage.

DEAN M. SOLENBERGER.